(12) United States Patent
Flick

(10) Patent No.: US 9,445,688 B2
(45) Date of Patent: Sep. 20, 2016

(54) CAPSULE PROVIDED WITH A CODE AND AUTOMATED BEVERAGE PREPARATION SYSTEM

(71) Applicant: Nestec S. A., Vevey (CH)

(72) Inventor: Jean-Marc Flick, Pomy (CH)

(73) Assignee: Nestec S. A., Vevey (CH)

( * ) Notice: Subject to any disclaimer, the term of this patent is extended or adjusted under 35 U.S.C. 154(b) by 0 days.

(21) Appl. No.: 14/779,079

(22) PCT Filed: Mar. 19, 2014

(86) PCT No.: PCT/EP2014/055510
§ 371 (c)(1),
(2) Date: Sep. 22, 2015

(87) PCT Pub. No.: WO2014/147128
PCT Pub. Date: Sep. 25, 2014

(65) Prior Publication Data
US 2016/0045060 A1 Feb. 18, 2016

(30) Foreign Application Priority Data

Mar. 22, 2013 (EP) .................................... 13160532

(51) Int. Cl.
*A47J 31/06* (2006.01)
*A47G 19/14* (2006.01)
(Continued)

(52) U.S. Cl.
CPC ........... *A47J 31/4492* (2013.01); *A47J 31/407* (2013.01); *B65D 85/8043* (2013.01); *G06K 7/01* (2013.01)

(58) Field of Classification Search
CPC .............. A47J 31/407; A47J 31/4492; B65D 85/8043–85/8046; B65D 2081/007; G06K 7/01

USPC ...... 99/295, 323; 426/77, 87, 115, 232, 383, 426/394, 433
See application file for complete search history.

(56) References Cited

U.S. PATENT DOCUMENTS 8,801,537 B1 * 8/2014 Seluga ................... A63B 53/02
473/246
2002/0048621 A1 * 4/2002 Boyd ................. A47J 31/3623
426/77

(Continued)

FOREIGN PATENT DOCUMENTS

DE 202011001661 U1 6/2011
FR 2625348 A1 6/1989

(Continued)

OTHER PUBLICATIONS

International Search Report, mailed Sep. 5, 2014, in PCT/EP2014/055510, filed Mar. 19, 2014.

(Continued)

*Primary Examiner* — Dana Ross
*Assistant Examiner* — Lindsey C Teaters
(74) *Attorney, Agent, or Firm* — Dunlap Codding, P.C.

(57) ABSTRACT

The invention relates to a capsule intended for delivering a beverage in a beverage preparation machine. The capsule comprises a code support surface on which a code is represented. The code comprises a first value for at least one capsule-related information. The code further comprises a first element and a second element arranged on the code support surface so as that the distance between the first element and the second element is a function of the first value.

22 Claims, 7 Drawing Sheets

(51) Int. Cl.

| | |
|---|---|
| A22C 13/00 | (2006.01) |
| A22C 17/10 | (2006.01) |
| A23G 3/28 | (2006.01) |
| A23P 1/00 | (2006.01) |
| A47J 31/44 | (2006.01) |
| A47J 31/40 | (2006.01) |
| B65D 85/804 | (2006.01) |
| G06K 7/01 | (2006.01) |

(56) References Cited

U.S. PATENT DOCUMENTS

2013/0209620 A1* 8/2013 Ozanne ................. A47J 31/407
426/115
2014/0328983 A1* 11/2014 Jarisch ................. A47J 31/4492
426/232
2015/0017293 A1* 1/2015 Carr .................... A47J 31/3623
426/232
2015/0144001 A1* 5/2015 Lo Foro ................. A47J 31/407
99/283

FOREIGN PATENT DOCUMENTS

| WO | 2011141532 A1 | 11/2011 |
|---|---|---|
| WO | 2014006054 A2 | 1/2014 |

OTHER PUBLICATIONS

Written Opinion of the International Searching Authority, mailed Sep. 5, 2014, in PCT/EP2014/055510, filed Mar. 19, 2014.

* cited by examiner

CAPSULE PROVIDED WITH A CODE AND AUTOMATED BEVERAGE PREPARATION SYSTEM

CROSS REFERENCE TO RELATED APPLICATIONS/INCORPORATION BY REFERENCE STATEMENT

This application is a US national stage application filed under 35 USC §371 of International Application No. PCT/EP2014/055510, filed Mar. 19, 2014; which claims benefit of EP Application No. 13160532.1, filed Mar. 22, 2013. The entire contents of the above-referenced applications are hereby expressly incorporated herein by reference.

BACKGROUND

The presently disclosed and/or claimed inventive concept(s) pertains to the field of the beverage preparation systems, in particular those using capsules of different types containing an ingredient for preparing a beverage. More particularly, the presently disclosed and/or claimed inventive concept(s) relates to a capsule comprising means for storing information related to said capsule, and a machine with a reading arrangement for reading said information providing an efficient, automated and safe solution to handle capsules of different type and/or dimensions.

For the purpose of the present description, a "beverage" is intended to include any human-consumable liquid substance, such as coffee, tea, hot or cold chocolate, milk, soup, baby food or the like. A "capsule" is intended to include any pre-portioned beverage ingredient or combination of ingredients (hereafter called "ingredient") within an enclosing packaging of any suitable material such as plastic, aluminium, a recyclable and/or bio-degradable material and combinations thereof, including a soft pod or a rigid cartridge containing the ingredient.

Certain beverage preparation machines use capsules containing an ingredient to be extracted or to be dissolved and/or an ingredient that is stored and dosed automatically in the machine or else is added at the time of preparation of the drink. Some beverage machines possess liquid filling means that include a pump for liquid, usually water, which pumps the liquid from a source of water that is cold or indeed heated through heating means, e.g. a thermoblock or the like.

In the field of coffee preparation, machines have been developed in which a capsule containing a beverage ingredient is inserted in a brewing device. The brewing device is tightly closed about the capsule, water is injected at a first face of a capsule, the beverage is produced in the closed volume of the capsule and a brewed beverage can be drained from a second face of the capsule and collected in a receptacle such as a cup or glass.

Brewing devices have been developed to facilitate insertion of a capsule into a chamber therein, for instance, by using a feeding arrangement or a motorized brewing unit.

WO 2001/084993 relates to a beverage machine with a movable drawer sliding horizontally to bring a capsule from a loading stated to an inserted position in a motorized brewing unit. This machine allows automating tasks like the introduction of a capsule into the brewing unit or the preparation of a plurality of beverages. However, for triggering the preparation of the beverage, the user has still to either activate manually the movable drawer sliding and/or press a start button.

Furthermore, it is also desirable to propose a beverage preparation system capable of handling a variety of different capsules, for example, capsules containing different volume of ingredient(s) to prepare different volumes of beverage and/or beverage of different type and/or beverage prepared using different recipes, with semi-automatic or automatic preparation modes.

However, having different types of capsules raises several issues, notably the increased complexity of the user interface and also the cost and complexity of the machine. Furthermore, even if enhancing the user's interaction with the machine by increasing the level of automation is highly desirable, it usually comes with safety issues, caused, for example, by moving parts actuated automatically by motors. In the field of the motorized beverage machines, systems have been provided to prevent or limit the risks of the insertion of inappropriate objects into the brewing chamber, like a finger or a spoon, which may cause damage to the machine and/or injuries to the user when the brewing unit is closed. For instance, EP1767129 relates to a beverage machine comprising a motorized brewing unit in which the capsule is inserted manually by gravity in an open passage between jaw members of the unit. For safety reason, the passage can be blocked by a motorized closing gate.

It is known to place barcodes on a capsule for coding information related to beverage preparation parameters. However, depending on the type of capsules and materials used to manufacture said capsules, it is difficulty to print reliably such an identifier, for example printing code on a metallic a capsule. Moreover, the use of space for coding information is not optimal and placing such a code onto a capsule is generally not desirable for aesthetic reasons. The reliability of standard optical systems for reading code is questionable, particularly when they are arranged in the harsh environment of ingredient processing module of beverage preparation systems, where dusts and vapours are often present.

Accordingly, there is a need for a beverage preparation system capable of handling a variety of different capsules without decreasing the convenience of use of such a system, without decreasing the safety level, and in a cost-efficient and reliable way. In particular, there is also a need to propose a solution for embedding information into/on the capsule, wherein the solution is reliable and cost-effective.

DETAILED DESCRIPTION

Figure 1:
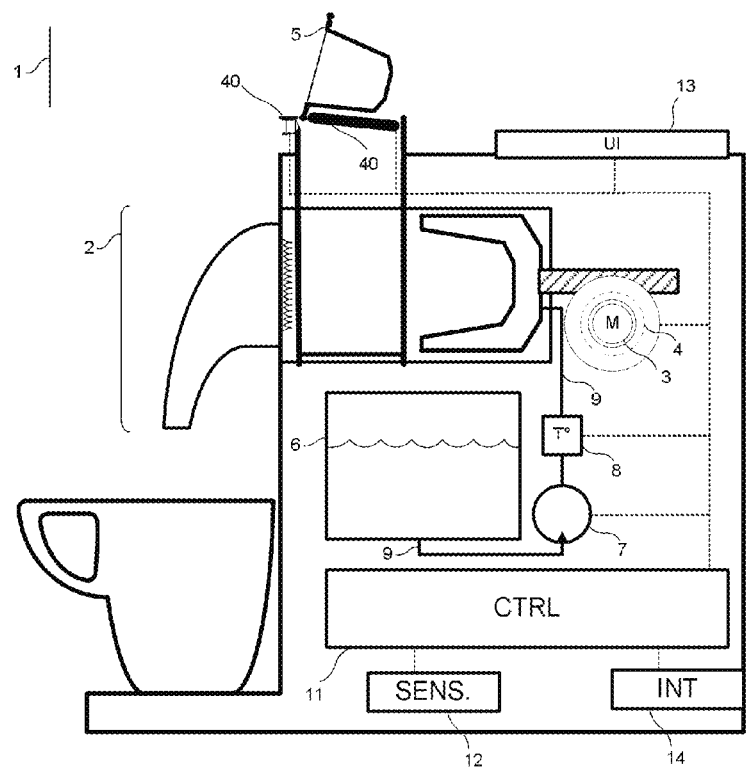
FIG. 1 is a schematic view of a beverage machine according to one non-limiting embodiment of the presently disclosed and/or claimed inventive concept(s).

In certain non-limiting embodiments, the presently disclosed and/or claimed inventive concept(s) provides a means for storing, reading and processing information related to a capsule, more particularly information for identifying said capsule within a beverage preparation machine and for retrieving or reading information for adjusting working parameters of the machine and/or for controlling parameters for preparing a beverage with said capsule. In another non-limiting embodiment, the presently disclosed and/or claimed inventive concept(s) provides a capsule embedding such means.

In certain non-limiting embodiments, the presently disclosed and/or claimed inventive concept(s) provides for control of optimal conditions for preparing a beverage.

In certain non-limiting embodiments, the presently disclosed and/or claimed inventive concept(s) provides more convenience, less user's intervention and more safety in the way of inserting capsules of different types in the machine. In another non-limiting embodiment, the presently disclosed and/or claimed inventive concept(s) provides added value functionalities such as use of capsules containing different volume of ingredient(s) to prepare volumes of beverage and/or beverage of different type and/or beverage prepared using different recipes, with semi-automatic or automatic preparation modes.

In certain non-limiting embodiments, the presently disclosed and/or claimed inventive concept(s) provides a solution for reliably reading information related to a capsule with a sensor disposed in the machine, for example in the processing module/brewing unit of the machine, where available spaces are quite limited and in a harsh environment (ingredients traces, presence of vapours and liquids, . . . ).

One or more of these embodiments are met by a capsule, or a machine, or a method as described in detail herein below or otherwise contemplated herein.

More particularly, according to a first non-limiting aspect, the presently disclosed and/or claimed inventive concept(s) relates to a capsule intended for delivering a beverage in a beverage preparation machine. The capsule comprises a code support surface on which a code is represented. The code comprises a first value for at least one capsule-related information. The code further comprises a first element and a second element arranged on the code support surface so as that the distance between the first element and the second element is a function of the first value.

It allows providing an efficient and cost effective solution of embedding data on the capsule, without requiring complex electronic means like RFID solutions. The solution is reliable and easy to manufacture since the first value is conveyed by the relative distance between the first and second element, without requiring any specific knowledge by the reader of the position of these elements. The absolute position of each element taken separately relatively to the reader is not relevant in itself, but only their relative positions. It allows also a reader to read the first value without knowing the precise orientation or position of the capsule, since the reading can be achieved by locating the first and the second element.

In an embodiment, the first element and the second element may be arranged on the code support surface so as that the distance between the first element and the second element is proportional to the first value. For example, the distance between the first and the second element can be comprised sensibly between 0 mm to 10 mm for coding a value between 0 and 100. The distance between the first and the second element is equal to 0 mm for coding a value of 0. The distance between the first and the second element is equal to 10 mm for coding a value of 100. The distance between the first and the second element is equal to 5 mm for coding a value of 50.

In an embodiment, the first value may also be comprised between a minimum value and a maximum value, the first element and the second element being arranged on the code support surface so as that the distance between the first element and the second element is function of the difference between the first value and the minimum value or the maximum value. For example, the distance between the first and the second element can be comprised sensibly between 0 mm to 10 mm for coding a value between 90 and 100. The distance between the first and the second element is equal to 0 mm for coding a value of 90. The distance between the first and the second element is equal to 10 mm for coding a value of 100. The distance between the first and the second element is equal to 5 mm for coding a value of 95.

In an embodiment, the first value may belong to a group of predefined values, each predefined value being identifiable by an index value, the first element and the second element being arranged on the code support surface so as that the distance between the first element and the second element is a function of one of the index values. For example, the first value can be chosen between the value "Pre-wetting OFF" being identifiable by a value index of 0, and the value "Pre-wetting ON" being identifiable by a value index of 1. The distance between the first and the second element can be comprised sensibly between 0 mm to 5 mm for coding an index value of 0, and sensibly between 5 mm to 10 mm for coding an index value of 1. If the distance between the first and the second element is comprised sensibly between 0 mm and 5 mm, the corresponding first value is "Pre-wetting OFF". If the distance between the first and the second element is comprised sensibly between 5 mm and 10 mm, the corresponding first value is "Pre-wetting ON".

In an embodiment, the first element and the second element are arranged sensibly on an arc shaped path so as that the angular distance between the first element and the second element is a function to the first value. For example, the angular distance between the first and the second element can be comprised sensibly between 0° to 90° for coding a value between 0 and 100. The distance between the first and the second element is equal to 0° for coding a value of 0. The distance between the first and the second element is equal to 90° for coding a value of 100. The distance between the first and the second element is equal to 45° for coding a value of 50.

In an embodiment, the capsule has a generally cup-shaped body and a lid such as a covering membrane. Membrane is assembled to cup along a peripheral rim of cup. The rim may comprise a seal, e.g. made of elastomeric or plastic material, for improving the fluid-tight engagement of the capsule in the brewing unit. Furthermore, the capsule in particular the rim and/or the membrane may bear a ring or toroid, e.g. for assisting manufacturing and/or handling of the capsule. Such capsule forms a packaging for containing an ingredient, e.g. ground coffee, of a beverage to be prepared with the beverage preparation machine. In an embodiment, the capsule forms a gastight packaging, e.g. made of aluminium or an aluminium-alloy. Alternatively, the capsule may be more or less pervious, e.g. perforated and/or made of organic, in particular plastic material, e.g. biodegradable material. The capsule's cup and/or the capsule's lid may be made of a monolithic material, e.g. a metallic material or a conductive ceramic and/or conducive organic material, or may be made of a structure covered or containing a conductive material, e.g. a conductive coating or track, e.g. an aluminium, iron and/or copper coating or track.

The code support surface may be located on the base part of the capsule, generally located at the opposite side of the covering membrane. This specific position allows placing the code in a convenient part of the capsules considering the brewing unit, since it can be read even after the closing of the brewing unit. It allows limiting the visual impact of the code on the capsule.

The code support surface may also extend toward the lateral wall of the capsule, at the border between the base part of the capsule. This specific position allows reducing manufacturing costs of the capsule, since only the inner part of the mould used for forming the capsule requires holding the pattern used to print/embossed/position the code without any requirement of indexing the upper part of the mould of the capsule.

The code support surface may also be located on the rim of the capsule or on the membrane. This specific position allows placing the code in a convenient part of the capsules considering the brewing unit, since it can be read even after the closing of the brewing unit. It allows limiting the visual impact of the code on the capsule.

In particular, the at least one capsule-related information may comprise information for recognizing a type associated to the capsule, and/or one or a combination of items of the following list:

information related to parameters for preparing a beverage with the capsule, such as temperatures of the water entering the capsule, flow rates of the water entering the capsule, pressures, sequence of operations during the preparation process, pre-wetting time, cup volumes, etc;

information for retrieving locally and/or remotely parameters for preparing a beverage with the capsule, for example an identifier allowing the recognition of a type for the capsule;

information related to the manufacturing of the capsule, such a production batch identifier, a date of production, a recommended date of consumption, an expiration date, etc;

information for retrieving locally and/or remotely information related to the manufacturing of the capsule.

Optionally, the code may comprise a second value for at least one capsule-related information, the code further comprises a third element arranged on the code support surface so as that the distance between the second element and the third element is a function of the second value. In an embodiment, the first element and the second element may be arranged on the code support surface so as that the distance between the first element and the second element is proportional to the first value. For example, the distance between the first and the second element can be comprised sensibly between 0 mm to 10 mm for coding a value between 0 and 100. The distance between the first and the second element is equal to 0 mm for coding a value of 0. The distance between the first and the second element is equal to 10 mm for coding a value of 100. The distance between the first and the second element is equal to 5 mm for coding a value of 50.

In an embodiment, the first value may also be comprised between a minimum value and a maximum value, the first element and the second element being arranged on the code support surface so as that the distance between the first element and the second element is function of the difference between the first value and the minimum value or the maximum value. For example, the distance between the first and the second element can be comprised sensibly between 0 mm to 10 mm for coding a value between 90 and 100. The distance between the first and the second element is equal to 0 mm for coding a value of 90. The distance between the first and the second element is equal to 10 mm for coding a value of 100. The distance between the first and the second element is equal to 5 mm for coding a value of 95.

In an embodiment, the first value may belong to a group of predefined values, each predefined value being identifiable by an index value, the first element and the second element being arranged on the code support surface so as that the distance between the first element and the second element is a function of one of the index values. For example, the first value can be chosen between the value "Pre-wetting OFF" being identifiable by a value index of 0, and the value "Pre-wetting ON" being identifiable by a value index of 1. The distance between the first and the second element can be comprised sensibly between 0 mm to 5 mm for coding an index value of 0, and sensibly between 5 mm to 10 mm for coding an index value of 1. If the distance between the first and the second element is comprised sensibly between 0 mm and 5 mm, the corresponding first value is "Pre-wetting OFF". If the distance between the first and the second element is comprised sensibly between 5 mm and 10 mm, the corresponding first value is "Pre-wetting ON". The distance between the second and the third element can be comprised sensibly between 0 mm to 10 mm for coding a value between 70° C. and 100° C. The distance between the second and the third element is equal to 0 mm for coding a value of 70° C. The distance between the second and the third element is equal to 10 mm for coding a value of 100° C. The distance between the second and the third element is equal to 5 mm for coding a value of 85° C.

In an embodiment, the code support surface comprises at least one second code, the second code comprising the first value. It allows having redundancies for increasing reliability of the readings of the code. Hence, error-checking may be performed by comparison for example, and parts of the code affected by errors may be processed accordingly. Hence, it improves the probability of a successful reading of the code, should some parts of the code be unreadable. The second code can be sensibly similar to the code. Alternatively, the second code can be structurally different and comprises other information but comprises at least the first value.

In an embodiment, the first element is formed by a first sequence of symbols and the second element is formed by a second sequence of symbols. The first sequence of symbol may be distinct from the second sequence of symbols. Each symbol may be represented by an entity having a measurable characteristic, readable by a measuring arrangement, the measurable characteristic varying according to said symbol. Each symbol may be printed and/or embossed. The shape of the symbols may be chosen amongst the following non-exhaustive list: arch-shaped segments, segments which are individually rectilinear but extend along at least a part of the section, dots, polygons, geometric shapes. The symbols may be readable by an optical sensor included in a reading arrangement, the colour and/or the shape of each symbol being chosen according to said symbol. The symbols may be printed by an ink which is not visible by human eyes under natural light e.g., ink visible under UV. The symbols may be printed or embossed by a pattern which possesses surfaces having different reflective and/or absorbing properties to light. The pattern may possesses first surfaces having inclined mirroring or absorbing properties to light and second surfaces having flat mirroring or flat reflective properties to light. Other variable physical characteristics may be chosen to distinguish each symbol, for example the colour, the reflectivity, the opacity, the light absorption level, the magnetic field, the induced magnetic field, the resistivity, the capacity, etc. At least part of the symbols is represented on the code support surface by magnetically responsive surfaces. At least part of the symbols is for example represented on the code support surface by embossed surfaces. At least part of the symbols is for example represented on the code support surface by electrically-responsive surfaces. At least part of the symbols is for example represented on the code support surface by optically-readable surfaces.

According to a second non-limiting aspect, the presently disclosed and/or claimed inventive concept(s) relates to a beverage preparation machine having an ingredient processing module adapted to use for preparing beverages a capsule according to the first non-limiting aspect. The beverage preparation machine further comprises a code reader configured to:
  measure the distance between the first element and the second element;
  determine the first value according to said distance.

In particular, the beverage preparation machine may have an ingredient processing module adapted to use for preparing beverages capsules of a first type having a first size and capsules of a second type having a second size. The machine may comprise a positioner adapted to hold a capsule of the first or the second type. The beverage preparation machine may be configured to determine with its code reader the first value when the capsule is in the positioner. The first value comprises for example an information for determining whether the capsule inside the positioner is of the first type or the second type, and send this information to the ingredient processing module. In particular, the first and the second type of capsules have different dimensions and/or volumes for containing the ingredient. The machine may be adapted to handle more than two types of capsules. Consequently, the user has only to put a capsule of the first or the second type in the positioner for preparing a beverage. This simple, quick and intuitive gesture does not require the user to provide the information of the type of capsule he has chosen. The ingredient processing module, knowing the type of capsule that the user has positioned into the positioner, can use this information for adapting/configuring itself for handling this kind of capsule, and/or to adapt the preparation process according to this information, for example by adjusting the volume of water used according to the type of capsule. Moreover, the positioner can be placed outside the ingredient processing module, in particular outside a brewing unit of the ingredient processing module, such as (but not limited to) in a position where it is visible and accessible to the user, so that the latter may have a visual feedback. Consequently, if an object is placed into the positioner and is not detected as a capsule, the user can more easily extract it away from the positioner. The level of safety of the machine is then improved. The ingredient processing module may be configured to prepare a beverage according to parameters adapted to, or depending of, the size information. More particularly, the ingredient processing module may comprise assemblies configured to allow the insertion of a capsule of the first or the second type in an opened position, and to provide a brewing chamber in a closed position, the ingredient processing module being configured to adapt the configuration of the assemblies and/or of the brewing chamber according to the size information. The positioner may be adapted to hold a capsule of the first or the second type out of the ingredient processing module, the machine comprising transfer means configured to transfer the capsule to the ingredient processing module. The positioner may be positioned relatively to a passage to a preparation chamber of the ingredient processing module so as to allow the capsule to be transferred, into the ingredient processing module at least partially under the action of the gravity force. The transfer means may comprise only guiding means for guiding the capsule. In particular, the positioner may be positioned above the ingredient processing module and the passage, for instance, on top of the housing of the machine, to benefit from the action of the gravity.

According to a third non-limiting aspect, the presently disclosed and/or claimed inventive concept(s) relates to a method for reading a code on a capsule according to the first non-limiting aspect, the method comprising the steps of:
  measuring the distance between the first element and the second element;
  determining the first value according to said distance.

According to a fourth non-limiting aspect of the presently disclosed and/or claimed inventive concept(s), disclosed herein is a capsule identification unit of a beverage preparation machine, the capsule identification unit comprising: a first sensor arrangement and a second sensor arrangement, the sensors of which being configured to sense a metallic portion of a capsule when in operational proximity to the sensor; a signal processing circuit to receive a first signal from the first sensor arrangement and a second signal from the second sensor arrangement; a support member configured to support a capsule, wherein the first and second sensor arrangement are disposed so that the first and second signal therefrom can be processed by the signal processing circuit to identify capsules of different geometry when received on the support member.

The first and second sensor arrangement may each comprise one or more sensors. In a particular (but non-limiting) example, the first sensor arrangement comprises a pair of sensors. In a particular (but non-limiting) example, the second sensor arrangement comprises a pair of sensors. The sensors may be inductive sensors configured to detect variations in magnetic field. The variations in the magnetic field being due to a proximity of a body of a metallic capsule to a sensor. The identification unit may comprise a magnetic field generating unit, such as a coil. In a particular (but non-limiting) example, the first and second sensor arrangements are disposed discretely from each other.

The first and second sensors are arranged relative the support member, for example, they may be mounted thereto or connected to the support member via one or more intermediate members.

In certain non-limiting embodiments, the capsule identification unit is arranged such that a capsule is identified prior to it being processed by a brewing unit of the beverage preparation machine. For example, it may be arranged above the brewing unit such that an identified capsule can be transferred substantially vertically into the brewing unit.

The metallic portion of the capsule may comprise any suitably arranged portion of the capsule, for example, the body, the rim or lid.

According to a fifth non-limiting aspect of the presently disclosed and/or claimed inventive concept(s), disclosed herein is a method of identifying a capsule using a capsule identification unit of a beverage preparation machine, the capsule identification unit comprising: a first sensor arrangement and a second sensor arrangement, the sensors of which being configured to sense a metallic portion of a capsule when in operational proximity of the sensor; a signal processing circuit to receive a first signal from the first sensor arrangement and a second signal from the second sensor arrangement; a support member configured to support a capsule, wherein the first and second sensor arrangement are disposed so that the first and second signal therefrom can be processed by the signal processing circuit to identify capsules of different geometry when received on the support member, the method comprising: arranging a capsule on the capsule support; processing a resultant first and second signal using the signal processing circuit; outputting information relating to the identification of the capsule from the signal processing circuit.

The method according to the fifth may comprise using an identification device comprising any feature of the fourth non-limiting aspect.

Certain non-limiting embodiments of the presently disclosed and/or claimed inventive concept(s) will now be described with reference to the schematic drawings. A beverage machine 1 according to an embodiment is illustrated schematically on FIG. 1. The beverage machine comprises a brewing unit 2 which is coupled with an electrical motor 3 driving transmission means 4 for moving the brewing unit between an opened and a closed position. The brewing unit is represented in the opened position on FIG. 1. The brewing unit allows the preparation of a beverage from a capsule 5 containing at least one ingredient, e.g. ground coffee or tea or chocolate.

Figure 2A:
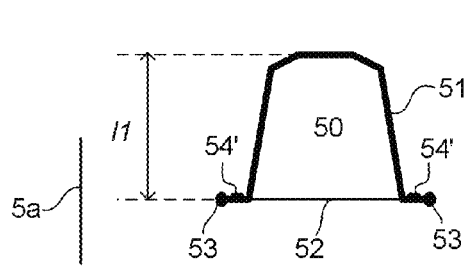
FIGS. 2a and 2b are cross sections of a capsule of the first type and of a capsule of the second type, both adapted to be used by the beverage machine to prepare a beverage.
Figure 2B:
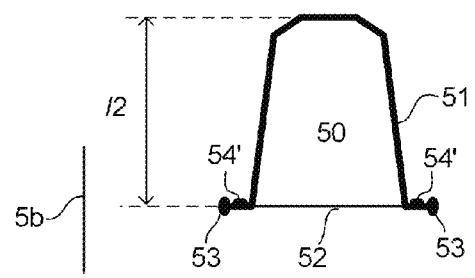

As shown in FIGS. 2a and 2b, the capsule has a generally cup-shaped body 51 and a lid such as a covering membrane 52. Membrane is assembled to cup along a peripheral rim 54 of cup. The rim may comprise a seal 54', e.g. made of elastomeric or plastic material, for improving the fluid-tight engagement of the capsule in the brewing unit. Furthermore, the capsule in particular the rim and/or the membrane may bear a ring or toroid 53, e.g. for assisting manufacturing and/or handling of the capsule. Such capsule forms a packaging for containing an ingredient 50, e.g. ground coffee, of a beverage to be prepared with the beverage preparation machine. In an embodiment, the capsule forms a gastight packaging, e.g. made of aluminium or an aluminium-alloy. Alternatively, the capsule may be more or less pervious, e.g. perforated and/or made of organic, in particular plastic material, e.g. biodegradable material. The capsule's cup and/or the capsule's lid may be made of a monolithic material, e.g. a metallic material or a conductive ceramic and/or conducive organic material, or may be made of a structure covered or containing a conductive material, e.g. a conductive coating or track, e.g. an aluminium, iron and/or copper coating or track. On FIG. 2a, there is shown therein a first type of the capsule 5 wherein the packaging for containing the ingredient 50 has a maximum first length l1 along its axis of symmetry. In particular, the first type of the capsule 5 may comprise a first volume V1 of the ingredient 50. On FIG. 2b, there is shown therein a second type of the capsule 5 wherein the packaging for containing the ingredient 50 has a maximum second length l2 along its axis of symmetry. The maximum second length l2 is longer than the maximum first length l1. In particular, the second type of the capsule 5 may comprise a second volume V2 of the ingredient 50. In the embodiment represented on the FIGS. 2a and 2b, the second volume V2 is bigger than the first volume V1.

As represented on FIG. 1, water supply means are also provided as a part of the machine, such means including a water reservoir 6, a water pump 7 and a water heater 8. Water circulates in a water circuit 9 which is linked to the brewing unit. Controller is also provided in the machine. The controller includes typically a control unit 11, sensors 12 and a user interface 13. The control unit includes processor(s), memories and programs enabling to provide appropriate inputs to and receive outputs from the different activation means of the machine in particular, the pump, heater, motor and user interface.

Figure 3A:
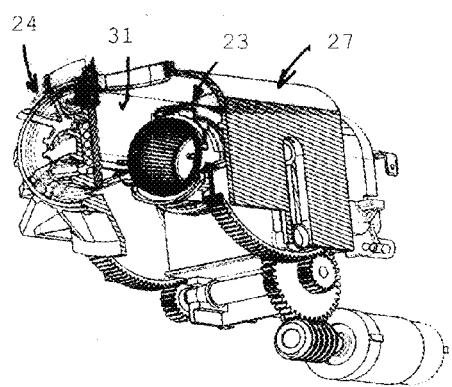
FIG. 3a is a partial cross section perspective representation of a brewing unit of the beverage machine of FIG. 1 in open position.
Figure 3B:
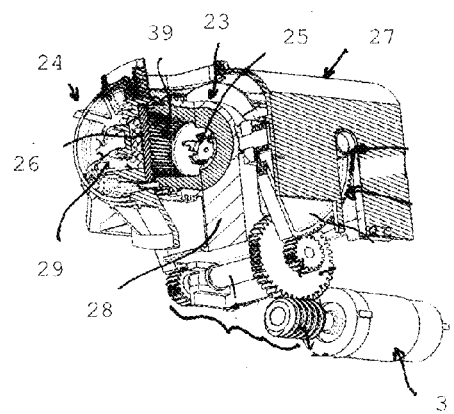
FIG. 3b shows a partial cross section perspective representation of a closed brewing unit of the beverage machine of FIG. 1 in an "empty closure mode."
Figure 3C:
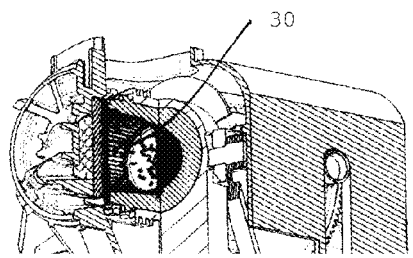
FIG. 3c shows a partial cross section perspective representation of a closed brewing unit of the beverage machine of FIG. 1 in a "capsule closure mode."
Figure 4A:
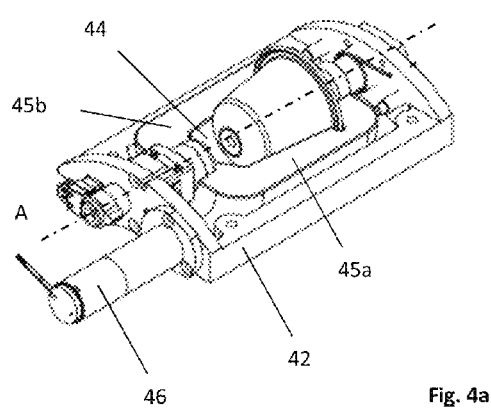
FIGS. 4a, 4b, 4c, 4d, and 4e are detailed views of a capsule positioner of the beverage machine of FIG. 1, according to one non-limiting embodiment of the presently disclosed and/or claimed inventive concept(s).
Figure 4B:
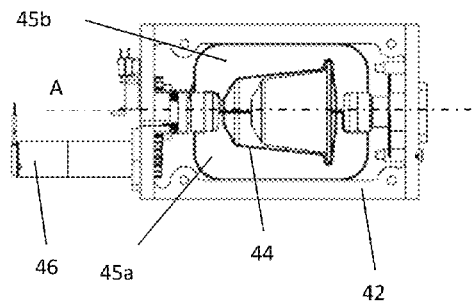
Figure 4C:
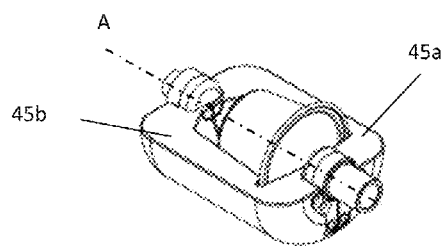
Figure 4D:
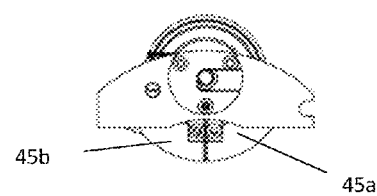
Figure 4E:
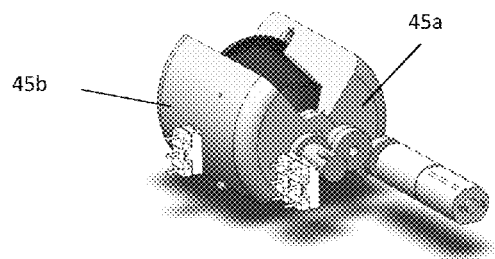
Figure 5:
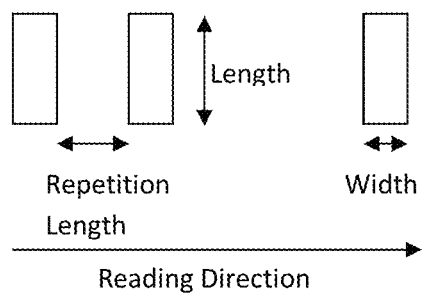
FIG. 5 is a schematic view of a code according to one non-limiting embodiment of the presently disclosed and/or claimed inventive concept(s).

Referring now to FIGS. 3a, 3b, and 3c, there is shown therein an exemplary motorized embodiment of the brewing unit. The brewing unit more particularly comprises a first assembly 23 and a second assembly 24 which are movable relatively one another. In this particular mode, the rear injection assembly 23 represents the capsule cage including injection blades 25. The front assembly 24 represents the beverage delivery assembly and includes a capsule delivery plate 26. The front assembly is associated to an outer casing 27 and the whole is movable relatively to the rear injection assembly 23 which remains fixed to a frame 28. The front delivery assembly 24 comprises a beverage outlet 29. The front delivery assembly 24 is moved relatively to the rear injection assembly 23 by means of the motor 3 which drives the transmission means 4. In the opened position (FIG. 3a), a passage 31 is provided between the first and second assemblies 23, 24 for allowing the insertion of a capsule. In the closed position (FIG. 3b), a brewing chamber 39 is provided.

The beverage machine further comprises a capsule positioner 40, which may function as a capsule identification unit, having a seat, for example, a capsule support, adapted to receive at least the first type and the second type of the capsule 5 out of the brewing chamber, such as (but not limited to) outside the brewing unit. In an embodiment, the positioner is arranged to store at least a second capsule, out of the brewing chamber, such as (but not limited to) outside the brewing unit. The capsule positioner may comprise a closing apparatus operable for switching the capsule holder between at least an opened position and a closed position. In the closed position, the capsule holder is configured to store the capsule in the seat. In the opened position, the capsule holder is configured to allow a capsule, pre-positioned into the capsule seat, entering the brewing unit chamber. More particularly, the capsule positioner is arranged so as to allow a capsule entering and passing through the passage of the brewing unit before reaching the capsule chamber, when the capsule positioner is set in its opened position. The capsule may be transferred from the capsule positioner in the opened position to the brewing unit by transfer means such guiding means, motorized elements, moving parts, actuators and/or any other means adapted to move the capsule out of the seat to the brewing unit, and in particular to the brewing unit chamber. Advantageously, the closing apparatus is arranged to close at least partially the passage when the capsule positioner is in its closed position, notably in order to prevent the unsafe entry of an unexpected object into the brewing unit.

In a first embodiment, as shown in FIGS. 4a, 4b, 4c, 4d and 4e, the capsule seat 44 is formed in a housing 42 that may be integrated to the housing of the beverage machine (not represented on the drawings). Alternatively, the capsule seat may be a separate part mounted on the housing of the beverage machine (not represented on the drawings). In the first embodiment, a closing apparatus comprises two movable shells 45 forming the base of the capsule seat when the closing apparatus is in a closed position. The two movable shells 45 may be provided with notches for guiding the introduction and the positioning of a capsule into said seat 44. In particular, the shells may be displaced by a motorized mechanism 46 to switch the closing apparatus between the closed (represented on FIG. 4a, 4b, 4c, 4d) and the opened position (represented on FIG. 4e). More particularly, each shell may be rotated along a longitudinal axis A by the motorized mechanism 46 to space apart each shell so as to allow the capsule to be released from the seat, for example by allowing the capsule to fall down into the brewing unit through the passage. When the capsule positioner is opened, for example when the shells are spaced apart as illustrated on FIG. 4e, the closing apparatus is configured to authorize a capsule positioned onto the capsule seat 44 to leave the capsule seat. In particular, the capsule positioner 40 is positioned on the upper part of the housing of the beverage machine to let a capsule falling into the passage 31 under the action of the gravity force, when the capsule positioner is opened. Alternatively, the shells may be mechanically linked by a mechanical coupling means with the brewing unit, and in particular with the first assembly 23 and/or the second assembly 24, so as to switch between the opened and closed positions depending on whether the brewing unit is opened or closed. For instance, the mechanical coupling means may be arranged to open the closing apparatus when the brewing unit is in the opened position, and to close the closing apparatus otherwise. The guides formed into the shells and surrounding the capsule seat, are disposed to ease the positioning of a capsule by a user when the capsule positioner is in the closed position, and/or to improve the holding of a capsule in the seat. Moreover, the guides may be arranged to guide the movement of the capsule when the capsule positioner is switched to its opened position, and to prevent a capsule inserted into the seat to be translated with the closing apparatus, for example when the capsule holder is switched from the closed to the opened position.

Figure 6:
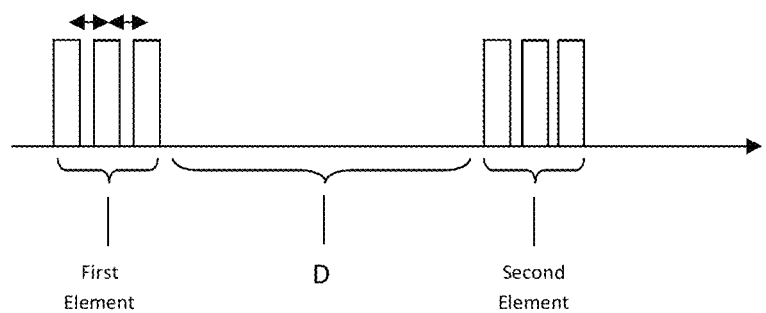
FIG. 6 shows a schema of principle for coding an information on the capsule according to one non-limiting embodiment of the presently disclosed and/or claimed inventive concept(s).
Figure 8:
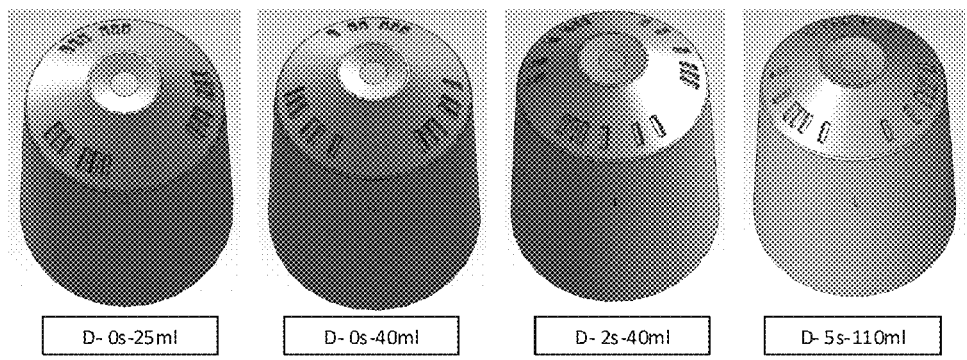
FIG. 8 shows four examples of a capsule provided with a code according to one non-limiting embodiment of the presently disclosed and/or claimed inventive concept(s).

Referring to FIGS. 6 and 8, there is shown therein 4 examples of a capsule according to an embodiment. A code is disposed on the rear of the capsule body, on the base part of the capsule, located at the opposite side of the covering membrane. The code comprises embossed surfaces on the rear of the capsule body. For example, each embossed surface has:

a width comprises between 0.5 mm and 1 mm, typically 0.75 mm;
a length comprises between 2 mm and 3 mm, typically 2.5 mm;
a depth relatively to the surface of the capsule between 0.1 and 0.5 mm.

The code comprises values related to the capsule and/or the beverage to be prepared with the capsule. These values may be used to differentiate different sizes of capsules, a pre-wetting time, a cup volume, etc. In the embodiment illustrated on FIGS. 4 and 8, the code comprises:

a first element comprising a sequence of three embossed surfaces separated by two non-embossed surfaces;
a second element comprising a sequence of one embossed surface and one non-embossed surface;
a third element comprising a sequence of one embossed surface and one non-embossed surface;
a fourth element comprising a sequence of one embossed surface and one non-embossed surfaces.

The distance D1 between the first element and the second element, is a function of a first value to encode, for example, the size or the kind of the capsule. In the four examples, all the capsules are of the same type, "large capsule". The distance D2 between the second element and the third element, is a function of a second value to encode, for example, the pre-wetting time. In the first and second examples, the pre-wetting time is set to 0 s, in the third example, to 2 s, and in the fourth example, to 5 s. The distance D3 between the third element and the fourth element, is a function of a third value to encode, for example, the volume of coffee to prepare. In the first example, the volume is set to 25 ml, in the second and third examples, the volume is set to 40 ml, in the fourth example, to 110 ml.

Figure 9:
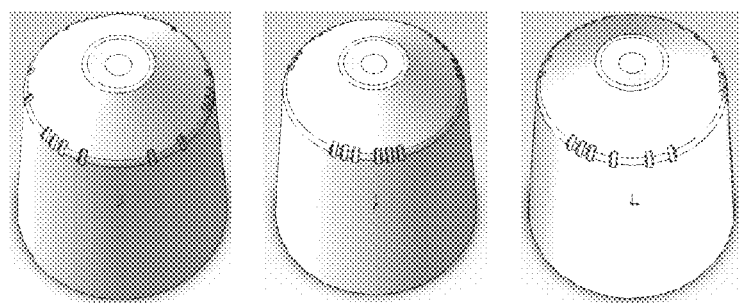
FIG. 9 shows three examples of a capsule provided with a code according to one non-limiting embodiment of the presently disclosed and/or claimed inventive concept(s).

The code is repeated three times, on the example of the FIG. 9. This replication is useful if one side of the capsule is damaged for example.

For reading the code on a capsule made with a magnetically-responsive material, like for example aluminium, an electromagnetic sensor will be placed in one shell of the loading system and tangentially to the rear surface of the capsule where the code is located. The reading may be performed by moving the electromagnetic sensor relatively to the code on the capsule. For example, the capsule may be rotated so as to perform a complete rotation, the sensor being maintained in a fixed position. Such a configuration of the sensor and a capsule is illustrated on FIG. 10. The reader comprises a motorized unit and a fixed measurement cell. The motorized unit is used to rotate the capsule in front of the measurement cell. The measurement cell is placed tangentially to the rear of the capsule. The distance between the capsule and the measurement cell can be adjusted. The targeted distance is for example about 0.2 to 1 mm for the sensor to be able to read the embossing. Alternatively, the sensor may be moved so as to scan all the code on the capsule, the capsule being maintained in a fixed position. The reading may be performed during the closure operation of the shells with the sensor being mounted in one of the shell.

Referring to FIG. 9, there is shown therein 3 examples of a capsule according to an embodiment. A code is embossed on the rear of the capsule body, extending toward the lateral wall of the capsule, at the border between the base part of the capsule. The code is formed by embossed surfaces on the rear of the capsule body.

Figure 7:
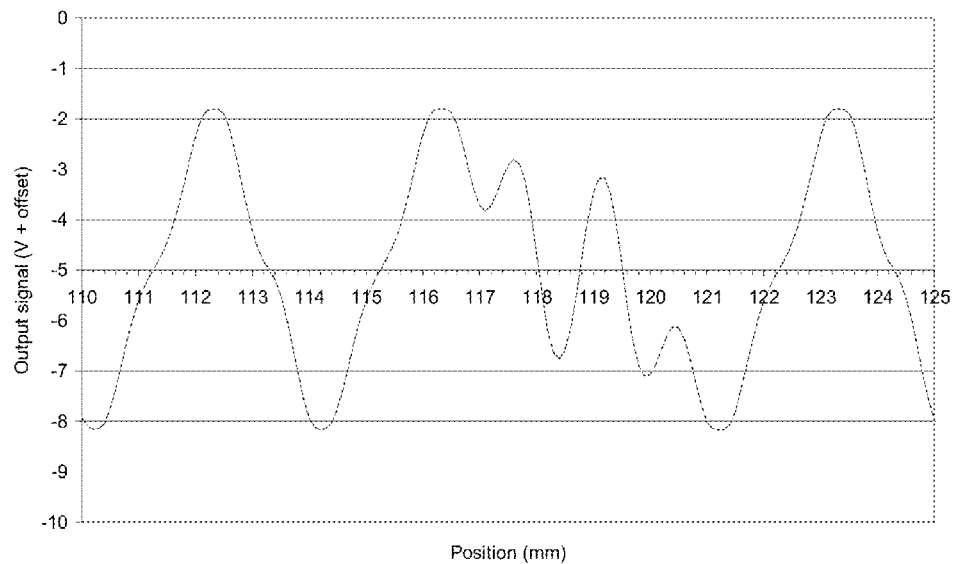
FIG. 7 is a diagram of the output of a sensor used by the code reader scanning a code on a capsule according to one non-limiting embodiment of the presently disclosed and/or claimed inventive concept(s).
Figure 10:
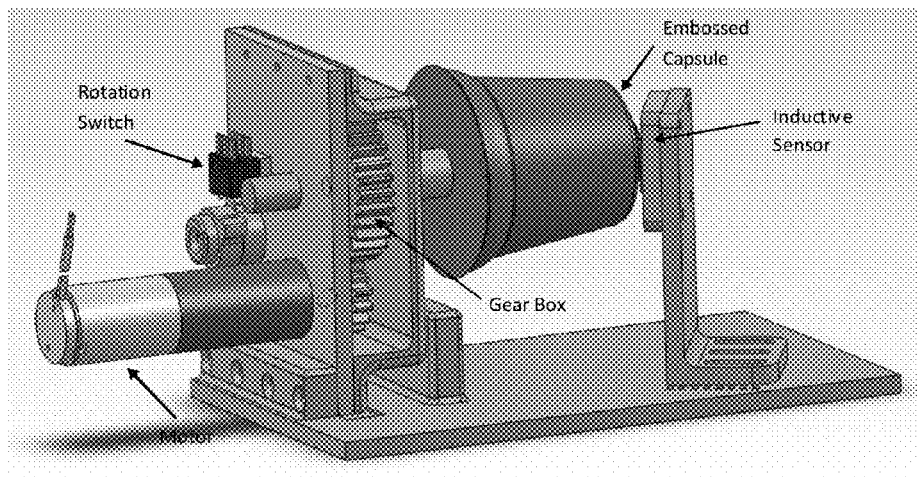
FIG. 10 is a schematic overview of a code reader according to one non-limiting embodiment of the presently disclosed and/or claimed inventive concept(s).

Referring to FIGS. 7 and 10, an example sensor adapted to read the code on the capsule and/or identify the capsule by means of its geometry is an inductive detection arrangement adapted to detect variations of electromagnetic field. Such a sensor may comprise a sensing element with a MEMS sensor. The MEMS sensor may comprise an inductive circuitry on one side of a silicon chip including a primary coil and two pairs of secondary coils (cross or parallel configurations). The first pair of the secondary coils is coupled to a first output of the MEMS sensor on which a first output signal V1 can be measured. The second pair of the secondary coils is coupled to a second output of the MEMS sensor on which a second output signal V2 can be measured. The MEMS sensor can also comprise an analogue and digital electronic circuitry on the back side on the same silicon chip, for example, a signal processing circuit. The MEMS sensor comprises means for generating an electromagnetic field via the primary coil. The MEMS sensor comprises a measuring arrangement for measuring the output signals V1 and V2. More particularly, the MEMS sensor allows measuring differences between the signals V1 and V2. Hence, when a metallic piece entered the electromagnetic field generated by the MEMS sensor, said generated electromagnetic field is disturbed and the perturbation can be detected by measuring variations of the signals V1 and V2. When the MEMS sensor is configured to work in a differential mode wherein the MEMS sensor is configured to output the difference D between the signal V1 and the signal V2, a metallic piece, placed in a parallel plane of the those comprising the secondary coils, and extending similarly over the two pairs of secondary coils, the difference D will be sensibly equal to zero. By contrast, a metallic piece, placed in a non-parallel plane of the those comprising the secondary coils, and/or extending only on some part of the two pairs of secondary coils, the difference D will be sensibly different to zero. The MEMS sensor can hence be used for example to differentiate between different curvatures of metallic parts, and also differentiate between embossed and non-embossed surfaces on metallic part of a capsule. FIG. 7 shows for example the output signal of such a sensor when used to scan a code comprising embossed surfaces on a metallic part of the capsule.

Figure 11:
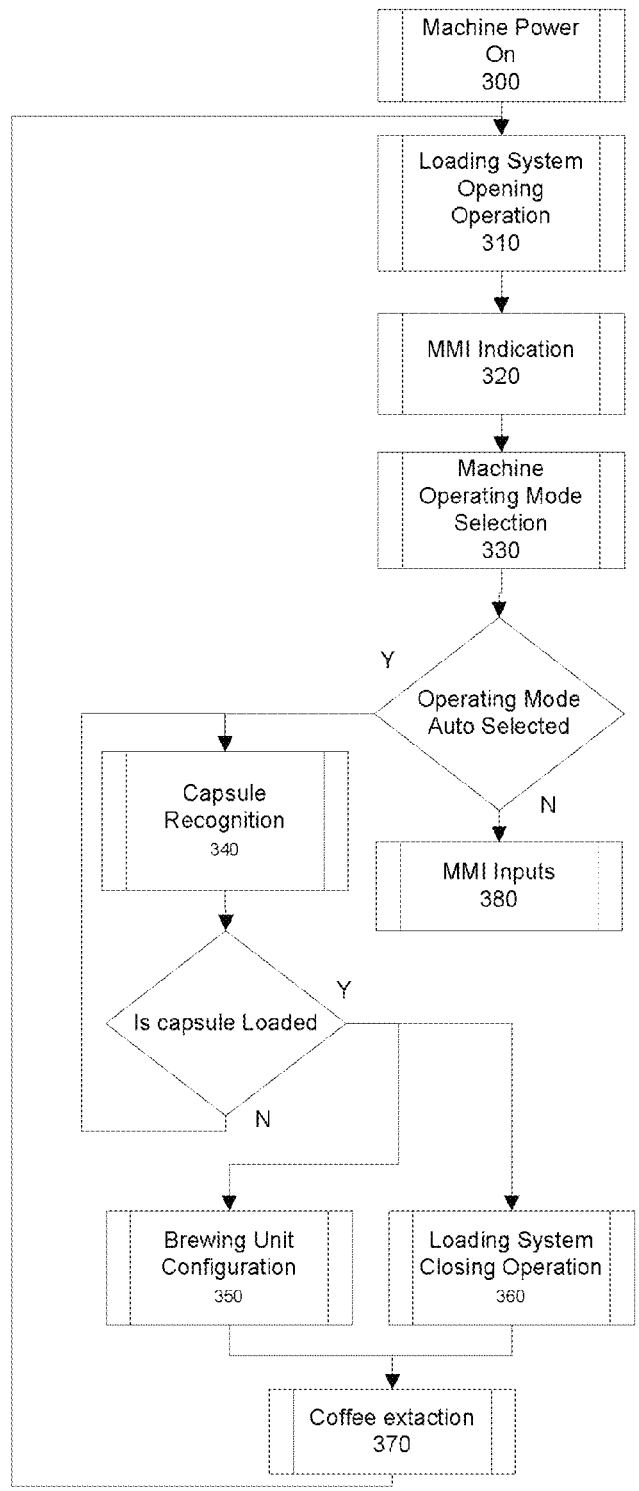
FIG. 11 is a flow diagram of an example operation of a beverage preparation machine according to one non-limiting embodiment of the presently disclosed and/or claimed inventive concept(s).

FIG. 11 shows a flow diagram of the operation of a beverage preparation machine according to the presently disclosed and/or claimed inventive concept(s) which comprises the aforementioned aspects.

The invention claimed is:

1. A capsule for delivering a beverage in a beverage preparation machine, the capsule comprising:
a code support surface on which a code is represented, the code comprising a first value for at least one capsule-related information, characterised in that the code further comprises a first element and a second element arranged on the code support surface so that the distance between the first element and the second element is a function of the first value, and wherein the first value is comprised between a minimum value and a maximum value, the first element and the second element being arranged on the code support surface so that the distance between the first element and the second element is a function of the difference between the first value and the minimum value or the maximum value.

2. The capsule according to claim 1, wherein the first element and the second element are arranged sensibly on an arc shaped path so that the angular distance between the first element and the second element is a function of the first value.

3. The capsule according to claim 1, wherein the code comprises a second value for at least one capsule-related information, the code further comprises a third element arranged on the code support surface so that the distance between the second element and the third element is a function of the second value.

4. The capsule according to claim 1, wherein the code support surface comprises at least one second code, the second code comprising the first value.

5. The capsule according to claim 1, wherein the first element is formed by a first sequence of symbols and the second element is formed by a second sequence of symbols.

6. The capsule according to claim 5, wherein the first sequence of symbols is distinct from the second sequence of symbols.

7. The capsule according to claim 5, wherein at least part of the symbols are represented on the code support surface by magnetically responsive surfaces.

8. The capsule according to claim 5, wherein at least part of the symbols are represented on the code support surface by embossed surfaces.

9. The capsule according to claim 5, wherein at least part of the symbols are represented on the code support surface by electrically-responsive surfaces.

10. The capsule according to claim 5, wherein at least part of the symbols are represented on the code support surface by optically-readable surfaces.

11. A capsule for delivering a beverage in a beverage preparation machine, the capsule comprising:
a code support surface on which a code is represented, the code comprising a first value for at least one capsule-related information, characterised in that the code further comprises a first element and a second element arranged on the code support surface so that the distance between the first element and the second element is a function of the first value, and wherein the first value belongs to a group of predefined values, each predefined value being identifiable by an index value, the first element and the second element being arranged on the code support surface so that the distance between the first element and the second element is a function of one of the index values.

12. The capsule according to claim 11, wherein the first element and the second element are arranged sensibly on an arc shaped path so that the angular distance between the first element and the second element is a function of the first value.

13. The capsule according to claim 11, wherein the code comprises a second value for at least one capsule-related information, the code further comprises a third element arranged on the code support surface so that the distance between the second element and the third element is a function of the second value.

14. The capsule according to claim 11, wherein the code support surface comprises at least one second code, the second code comprising the first value.

15. The capsule according to claim 11, wherein the first element is formed by a first sequence of symbols and the second element is formed by a second sequence of symbols.

16. The capsule according to claim 15, wherein the first sequence of symbols is distinct from the second sequence of symbols.

17. The capsule according to claim 15, wherein at least part of the symbols are represented on the code support surface by magnetically responsive surfaces.

18. The capsule according to claim 15, wherein at least part of the symbols are represented on the code support surface by embossed surfaces.

19. The capsule according to claim 15, wherein at least part of the symbols are represented on the code support surface by electrically-responsive surfaces.

20. The capsule according to claim 15, wherein at least part of the symbols are represented on the code support surface by optically-readable surfaces.

21. A beverage preparation system comprising:
   the capsule of any one of claims 1-20; and
   a beverage preparation machine having an ingredient processing module adapted to use for preparing beverages with the capsule, the beverage preparation machine further comprising a code reader configured to:
      measure the distance between the first element and the second element; and
      determine the first value according to said distance.

22. A method for reading a code on the capsule according to any one of claims 1-20, the method comprising the steps of:
   using a code reader of a beverage preparation machine to measure the distance between the first element and the second element; and
   determining the first value according to said distance.

* * * * *